(12) United States Patent
Lee et al.

(10) Patent No.: US 10,655,698 B2
(45) Date of Patent: May 19, 2020

(54) VIBRATION DAMPING DEVICE FOR VEHICLE

(71) Applicants: HYUNDAI MOTOR COMPANY, Seoul (KR); KIA MOTORS CORPORATION, Seoul (KR)

(72) Inventors: Jae Kwon Lee, Hwaseong-si (KR); Kwang Hwa Bai, Ulsan (KR); Hae Won Kim, Ulsan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 58 days.

(21) Appl. No.: 15/801,012

(22) Filed: Nov. 1, 2017

(65) Prior Publication Data
US 2018/0172102 A1 Jun. 21, 2018

(30) Foreign Application Priority Data
Dec. 15, 2016 (KR) .......................... 10-2016-0171897

(51) Int. Cl.
*F16F 7/10* (2006.01)
*B60G 17/0195* (2006.01)
*F16F 7/108* (2006.01)

(52) U.S. Cl.
CPC ........ *F16F 7/1011* (2013.01); *B60G 17/0195* (2013.01); *B60G 2204/18* (2013.01); *F16F 7/108* (2013.01); *F16F 2228/04* (2013.01)

(58) Field of Classification Search
CPC ...... F16F 7/1011; F16F 7/108; B60G 17/0195
USPC ....................................................... 123/192.2
See application file for complete search history.

(56) References Cited

U.S. PATENT DOCUMENTS 5,848,663 A 12/1998 Kuriki
2007/0144842 A1* 6/2007 Zhou ...................... F16F 9/535
188/267

FOREIGN PATENT DOCUMENTS

| JP | H06033982 A | 2/1994 |
|---|---|---|
| JP | 3124388 B2 | 1/2001 |
| JP | 3163862 B2 | 5/2001 |
| JP | 3308306 B2 | 7/2002 |
| KR | 10-0496325 B1 | 6/2005 |

OTHER PUBLICATIONS

"Active Engine Mount System in the New Audi S8," Development Acoustics, Jan. 2013, vol. 74, pp. 35-38.

* cited by examiner

*Primary Examiner* — Lindsay M Low
*Assistant Examiner* — Omar Morales
(74) *Attorney, Agent, or Firm* — Morgan, Lewis & Bockius LLP

(57) ABSTRACT

A vibration damping device for a vehicle includes a base connected to an engine, an inertial mass, including at least a portion that includes a permanent magnet, movably mounted over the base, an actuator including an electromagnet fixedly mounted on the base to vibrate the inertial mass based on attractive and repulsive forces which alternately act between the inertial mass and the electromagnet, and a controller that regulates a current, which is applied to the electromagnet, such that vibration of the engine is dampened by vibration of the inertial mass.

5 Claims, 3 Drawing Sheets

VIBRATION DAMPING DEVICE FOR VEHICLE

CROSS-REFERENCE TO RELATED APPLICATION

This application is based on and claims the benefit of priority to Korean Patent Application No. 10-2016-0171897, filed on Dec. 15, 2016, with the Korean Intellectual Property Office, the disclosure of which is incorporated herein in its entirety by reference.

TECHNICAL FIELD

The present disclosure relates to a vibration damping device for a vehicle.

BACKGROUND

In general, an engine of a vehicle produces vibration and noise due to reciprocating up and down movement of a piston and a connecting rod, which are provided in the engine, the moment of inertia of a crankshaft coupled to the connecting rod, which reciprocally moves up and down, and shaking occurring in a longitudinal direction of the crankshaft when the crankshaft rotates. To prevent the vibration and the noise, which result from the causes, from being transferred to a vehicle body, an engine mount formed of rubber having elasticity is mounted in the vehicle body.

Although the engine mount formed of rubber to accomplish the above purpose exhibits excellent damping performance in high-frequency and low-amplitude vibration, the engine mount is remarkably weak in low-frequency and large-displacement vibration. The engine mount may not be sufficiently damp both of the high-frequency and low-amplitude vibration and the low-frequency and large-displacement vibration.

In this regard, fluid sealed engine mounts have been used to damp wide-range vibration, which includes the high-frequency and low-amplitude vibration and the low-frequency and large-displacement vibration applied to the engine mount as the engine operates. In particular, recently, active control engine mount (ACM) systems have been suggested to prevent the reduction in noise, vibration and hardness (NVH) of a cylinder-deactivation (CDA) engine developed to improve fuel efficiency of a vehicle.

As described above, the ACM system may be employed only when the cylinders of the CDA engine are varied. The ACM system receives a cylinder pulse, a crank pulse, and a cylinder off signal from an electronic control unit (ECU), estimates the vibration based on revolutions per minute (RPM) of the engine, and damps the vibration by operating the actuator.

However, according to the related art, since the ACM system is mounted between the engine and the vehicle, the high weight of the engine fully acts on the ACM system. Therefore, according to the related art, in the ACM system, a large amount of energy is required to damp the vibration of the engine.

SUMMARY

The present disclosure has been made to solve the above-mentioned problems occurring in the prior art while advantages achieved by the prior art are maintained intact.

An aspect of the present disclosure provides a vibration damping device for a vehicle, which has a structure improved to save energy required to damp the vibration of an engine.

Further, an aspect of the present invention provides a vibration damping device for a vehicle, which has a structure improved to damp multi-axis vibration of an engine.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vibration damping device for a vehicle may include a base connected to an engine, an inertial mass, including at least a portion that includes a permanent magnet, movably mounted over the base, an actuator including an electromagnet fixedly mounted on the base to vibrate the inertial mass based on attractive and repulsive forces which alternately act between the inertial mass and the electromagnet, and a controller which regulates a current applied to the electromagnet such that vibration of the engine is dampened by vibration of the inertial mass.

Preferably, the controller may regulate the current applied to the electromagnet such that a vibration phase of the inertial mass makes a phase difference of 180° from a vibration phase of the engine.

Preferably, the controller may regulate the current applied to the electromagnet such that a vibration amplitude of the inertial mass is identical to a vibration amplitude of the engine.

Preferably, the electromagnet may be mounted to vibrate the inertial mass in a vertical direction of the engine as the attractive and repulsive forces alternately act in the vertical direction of the engine, and the controller may regulate the current applied to the electromagnet such that vibration of the engine, which is generated in the vertical direction, is dampened by vibration of the inertial mass, which is generated in the vertical direction.

Preferably, the electromagnet may be interposed between a top surface of the base and a bottom surface of the inertial mass.

Preferably, the vibration damping device may further include an elastic member interposed between the inertial mass and the base to elastically support the inertial mass in the vertical direction.

Preferably, the electromagnet may be mounted such that the inertial mass vibrates in a horizontal direction of the engine as the attractive and repulsive forces alternately act in the horizontal direction of the engine. The controller may regulate the current applied to the electromagnet such that vibration of the engine, which is generated in the horizontal direction, is dampened by the vibration of the inertial mass, which is generated in the horizontal direction.

Preferably, the base may include a protrusion part protruding toward the inertial mass. The inertial mass may include a recess part formed to surround the protrusion part. The electromagnet may be coupled to the protrusion part such that the attractive and repulsive forces alternately act in the horizontal direction.

Preferably, the electromagnet may include a first electromagnet coupled to the protrusion part such that the attractive and repulsive forces alternately act in an X axial direction of the engine, and a second electromagnet coupled to the protrusion part such that the attractive and repulsive forces alternately act in a Y axial direction of the engine. The controller may individually control a current applied to the first electromagnet and a current applied to the second electromagnet, such that an angle of the attractive and repulsive forces with respect to the X axial direction and an angle of the attractive and repulsive forces with respect to the Y axial direction are varied with a vibration aspect of the engine.

Preferably, the vibration damping device may further include an elastic member interposed between the protrusion part and the recess part to elastically support the inertial mass in the horizontal direction.

Preferably, the elastic member may include a leaf spring provided to surround at least a portion of the protrusion part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
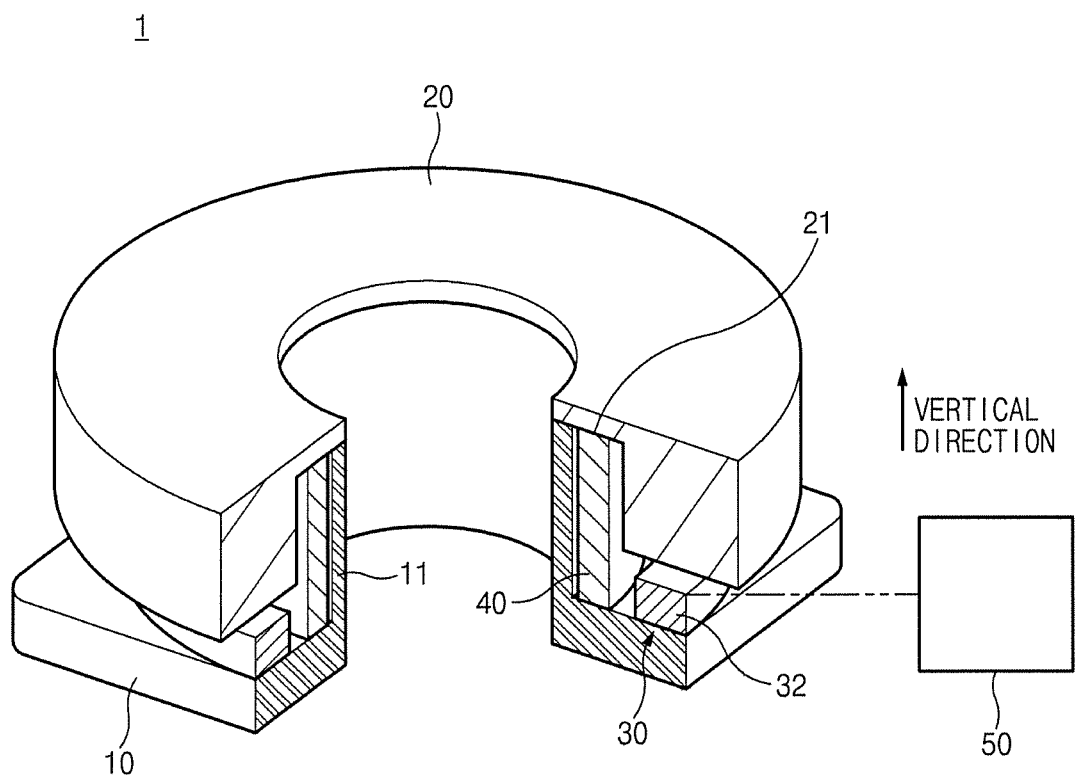
FIG. 1 is a partially cut-away perspective view illustrating a vibration damping device for a vehicle, according to a first embodiment of the present disclosure.

Terms and words used in the specification and the claims shall not be interpreted as commonly-used dictionary meanings, but shall be interpreted as to be relevant to the technical scope of the invention based on the fact that the inventor may properly define the concept of the terms to explain the invention in best ways. Accordingly, the embodiments and the configurations depicted in the drawings are illustrative purposes only and do not represent all technical scopes of the embodiments, so it should be understood that various equivalents and modifications may exist at the time point of filing this application.

The size of each of elements and the size of a specific part of the element, which are shown in accompanying drawings, may be exaggerated, omitted or schematically drawn for the purpose of convenience or clarity. In addition, the size of elements does not utterly reflect an actual size. In the following description, detailed descriptions of functions or configurations of well-known elements will be ruled out in order not to unnecessarily obscure the gist of the present disclosure.

Figure 2:
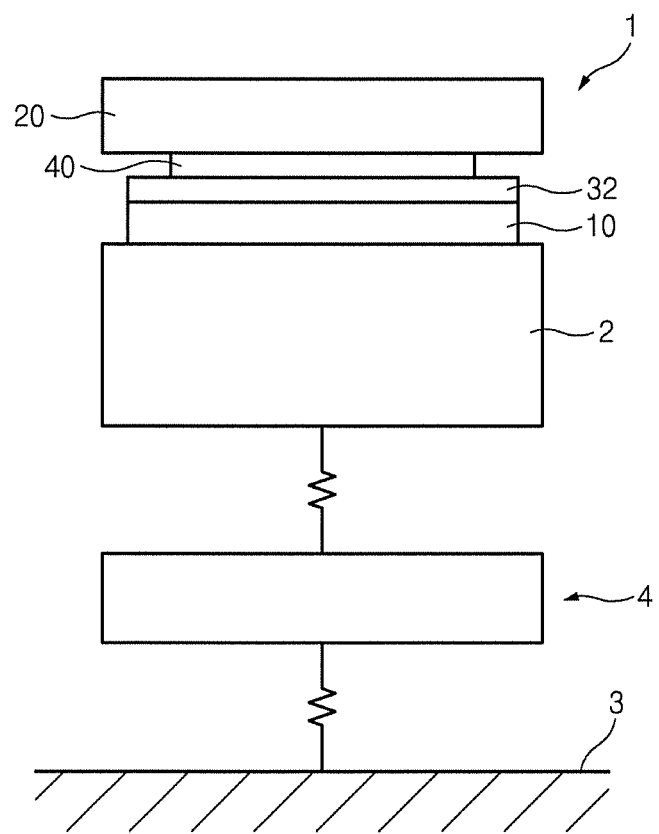
FIG. 2 is a cross-sectional view illustrating the use of the vibration damping device for the vehicle illustrated in FIG. 1.

FIG. 1 is a partially cut-away perspective view illustrating a vibration damping device for a vehicle, according to a first embodiment of the present disclosure, and FIG. 2 is a cross-sectional view illustrating the use of the vibration damping device for the vehicle illustrated in FIG. 1.

Referring to FIG. 1, according to an embodiment of the present disclosure, a vibration damping device for a vehicle (vibration damping device 1) includes: a base 10 connected to an engine 2; an inertial mass 20 which has at least a portion including a permanent magnet and is movably mounted over the base 10; an actuator 30 which includes an electromagnet 32 fixedly mounted on the base 10 to vibrate the inertial mass 20 based on attractive and repulsive forces alternately acting between the inertial mass 20 and the electromagnet 32; an elastic member 40 which is interposed between the inertial mass 20 and the base 10 to elastically support the inertial mass 20; and a controller 50 which regulates a current applied to the electromagnet 32 such that the vibration of the engine 2 is dampened by the vibration of the inertial mass 20. Preferably, the vibration damping device 1 is mounted on a cylinder deactivation (CDA) engine which controls the number of cylinders actuated based on the travelling state of a vehicle, but the present disclosure is not limited thereto.

The controller 50 is an electric circuitry that executes instructions of software which thereby performs various functions described hereinafter.

As illustrated in FIG. 2, the base 10 is fixedly mounted on the engine 2 to vibrate together with the engine 2. As illustrated in FIG. 2, preferably, an engine mount 4 including a damping spring and a damper is interposed between the engine 2 and a vehicle body 3. The vibration damping device 1 may more effectively damp the vibration of the engine 2 with the assistance of the engine mount 4.

As illustrated in FIG. 1, the base 10 preferably has a hollow structure in which the central portion thereof is empty, but the present disclosure is not limited thereto. The base 10 may include a protrusion part 11 protruding in a vertical direction of the engine 2 toward the inertial mass 20 as illustrated in FIG. 1.

The inertial mass 20 is mounted over the base 10 movably in the vertical direction such that the inertial mass 20 vibrates in the vertical direction. The inertial mass 20 has mass smaller than that of the engine 2, and may have at least a portion including a permanent magnet.

As illustrated in FIG. 1, the inertial mass 20 preferably has a hollow structure in which the central portion thereof is empty with the same diameter as that of the center of the base 10, but the present disclosure is not limited thereto. As illustrated in FIG. 1, the inertial mass 20 preferably has a predetermined thickness such that the bottom surface of the inertial mass 20 is spaced apart from the top surface of the base 10 by a predetermined distance, but the present disclosure is not limited thereto.

As illustrated in FIG. 1, the inertial mass 20 may include a recess part 21 formed to surround the protrusion part 11. The recess part 21 has the bottom surface seated on the top surface of the protrusion part 11, and has a lateral side spaced apart from that of the protrusion part 11 by a predetermined distance.

The actuator 30 is provided to vibrate the inertial mass 20 in the vertical direction. For instance, the actuator 30 may include the electromagnet 32 coupled to the top surface of the base 10 to be interposed between the top surface of the base 10 and the bottom surface of the inertial mass 20, as illustrated in FIG. 1. The electromagnet 32 has a polarity changed according to the direction of a current flowing through the electromagnet 32, and attractive and repulsive forces may alternately act between the electromagnet 32 and inertial mass 20 based on the change of the polarity. Accordingly, when the polarity of the electromagnet 32 is changed at a predetermined period, the inertial mass 20 vibrates in the vertical direction at a frequency corresponding to the predetermined period in the state that the inertial mass 20 is elastically supported by the elastic member 40.

The elastic member 40 is provided to elastically support the inertial mass 20 in the vertical direction. For instance, the elastic member 40 may be a leaf spring which is interposed between the lateral side of the protrusion part 11 and the lateral side of the recess part 21 and has one end supported by the top surface of the base 10 and an opposite end supported by the bottom surface of the recess part 21, as illustrated in FIG. 1. The elastic member 40 may be formed of various materials. For instance, the elastic member 40 may be formed of a rubber material or a metal material which is elastically deformable. When the engine 2 and the inertial mass 20 vibrate in the vertical direction, the elastic member 40 is compressed and stretched such that the vibration force of the inertial mass 20 and the vibration force of the engine 2 cancel each other out.

The controller 50 controls the vibration damping device to damp vibration, which is generated in the vertical direction (vertical vibration), of the engine 2.

For instance, the controller 50 may regulate a current applied to the electromagnet 32 such that vertical vibration frequencies of the inertial mass 20 and the engine 2 are identical to each other, and vertical vibration phases of the inertial mass 20 and the engine 2 make the phase difference of 180° from each other.

The vertical vibration frequency and the vertical vibration phase of the engine 2 are proportional to revolutions per minute (RPM) of the engine 2. Accordingly, the vertical vibration frequency and the vertical vibration phase corresponding to the RPM of the engine 2 may be previously stored in the controller 50. Accordingly, the controller 50 may regulate the current applied to the electromagnet 32 based on the RPM of the engine 2 such that vertical vibration frequencies of the inertial mass 20 and the engine 2 are identical to each other, and vertical vibration phases of the inertial mass 20 and the engine 2 make the phase difference of 180° from each other. The vertical vibrations of the engine 2 and the inertial mass 20 cancel each other out and thus the vertical vibration of the engine 2 is damped.

For instance, the controller 50 may regulate the current applied to the electromagnet 32 such that the inertial mass 20 and the engine 2 are identical to each other in vertical vibration amplitude. In this case, the vertical vibrations of the engine 2 and the inertial mass 20 cancel each other out at a high ratio, and thus the vertical vibration may be damped at the higher ratio.

Although the controller 50 regulates the vibration aspect of the inertial mass 20 based on data previously stored therein, the present disclosure is not limited thereto. In other words, the controller 50 may adjust the vibration aspect of the inertial mass 20 based on data such as a vibration frequency, a vibration phase, and a vibration amplitude measured by an accelerator sensor and other sensors in real time.

As described above, the vibration damping device 1 may damp the vibration of the engine 2 by dynamically absorbing the vibration of the engine 2 through the inertial mass 20 having mass smaller than that of the engine 2. Accordingly, the vibration damping device 1 may save energy required to damp the vibration of the engine 2, as compared to an ACM system according to the related art, which damps the vibration of the engine through an actuator to which the load of the engine is fully applied.

Figure 3:
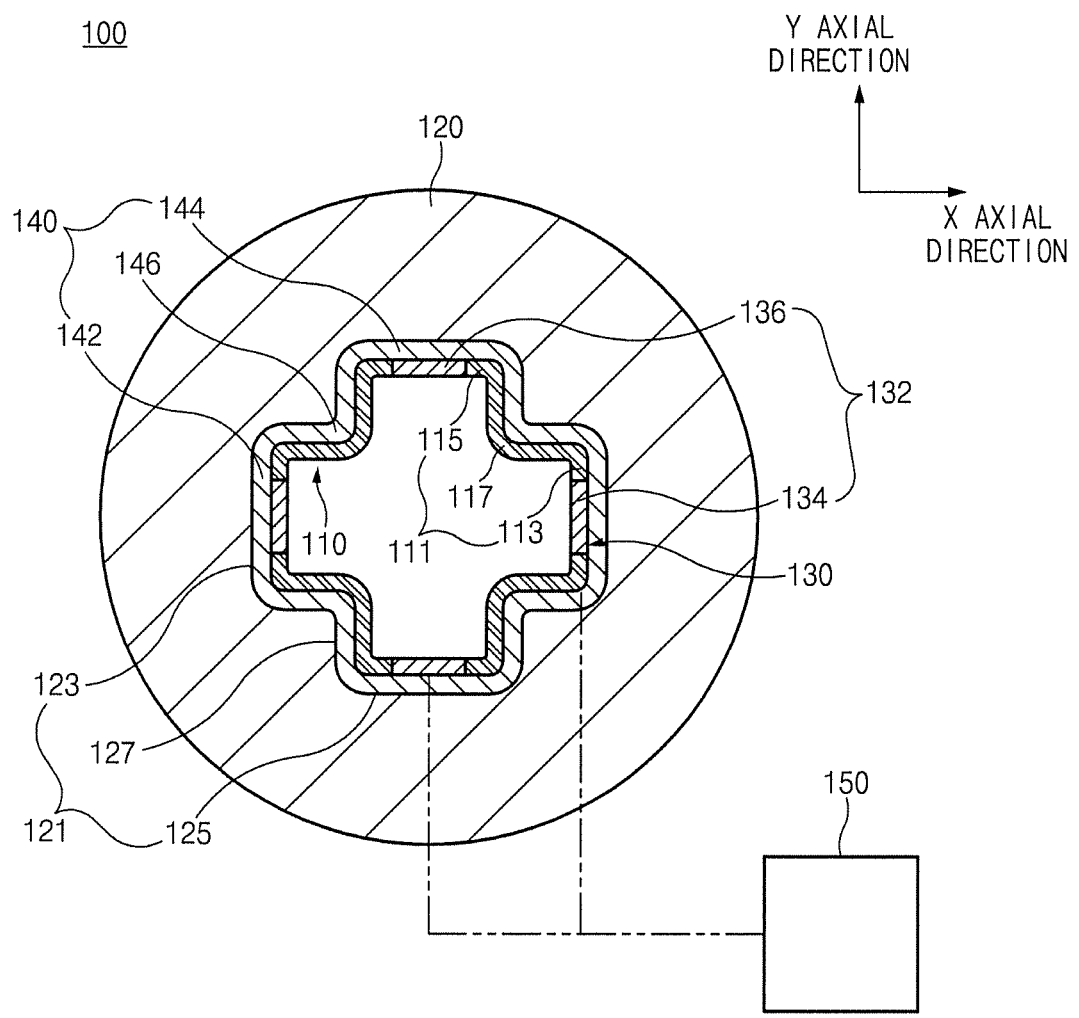
FIG. 3 is a cross-sectional view illustrating a vibration damping device for a vehicle, according to a second embodiment of the present disclosure.

FIG. 3 is a cross-sectional view illustrating a vibration damping device for a vehicle, according to a second embodiment of the present disclosure.

Referring to FIG. 3, a vibration damping device for a vehicle according to a second embodiment of the present disclosure (vibration damping device 100) has a difference from the vibration damping device 1 in that the structure of the vibration damping device 100 is modified to damp vibration generated in a horizontal direction (horizontal vibration). Hereinafter, the vibration damping device 100 will be described while focusing on the difference.

As illustrated in FIG. 3, a protrusion part 111 of a base 110 may include a first section 113 provided at a lateral side of the protrusion part 111, which allows a face direction of the first section 113 to be parallel to an X axial direction component of horizontally directional components (horizontal direction) of the engine 2. The protrusion part 111 may include a second section 115 provided at a lateral side of the protrusion part 111, which allows a face direction of the second section 115 to be parallel to a Y axial direction component perpendicular to the X axial direction component of the horizontal direction components. The protrusion part 111 may include a third section 117 provided at a lateral side of the protrusion part 111, which connects the first section 113 with the second section 115. In this case, the horizontal direction of the engine 2 refers to a direction perpendicular to the vertical direction of the engine 2 described above.

As illustrated in FIG. 3, a recess part 121 of an inertial mass 120 may include a first section 123 provided at a lateral side of the recess part 121, which allows a face direction of the first section 123 to be parallel to the X axial direction and is spaced apart from the first section 113 of the protrusion part 111 by a predetermined distance. The recess part 121 may include a second section 125 provided on a lateral side of the recess part 121, which allows a face direction of the second section 125 to be parallel to the Y axial direction and is spaced apart from the second section 115 of the protrusion part 111 by a predetermined distance. The recess part 121 may include a third section 127 provided at a lateral side of the third section 127, which connects the first section 123 to the second section 125, and is spaced apart from the third section 117 of the protrusion part 111 by a predetermined distance.

An electromagnet 132 of an actuator 130 is mounted in such a manner that attractive and repulsive forces alternately act in the horizontal direction between the electromagnet 132 and an inertial mass 120. For instance, the electromagnet 132 may include a first electromagnet 134 coupled to the protrusion part 111 such that the attractive and repulsive forces alternately act in the X axial direction, and a second electromagnet 136 coupled to the protrusion part 111 such that the attractive and repulsive forces alternately act in the Y axial direction.

As illustrated in FIG. 3, the first electromagnet 134 is preferably buried in the first section 113 of the protrusion part 111 to face the first section 123 of the recess part 121. The first electromagnet 134 may allow the inertial mass 120 to vibrate in the X axial direction.

As illustrated in FIG. 3, the second electromagnet 136 is preferably buried in the second section 115 of the protrusion part 111 to face the second section 125 of the recess part 121. The second electromagnet 136 may allow the inertial mass 120 to vibrate in the Y axial direction.

As illustrated in FIG. 3, an elastic member 140 may include a first section 142 interposed between the first section 113 of the protrusion part 111 and the first second 123 of the recess part 121, a second section 144 interposed between the second section 115 of the protrusion part 111 and the second section 125 of the recess part 121, and a third section 146 interposed between the third section 117 of the protrusion part 111 and the third section 127 of the recess part 121. When the inertial mass 120 vibrates in the horizontal direction, the elastic member 140 is compressed and stretched such that the vibration force of the inertial mass 120 and the vibration force of the engine 2 cancel each other out.

For instance, a controller 150, an electric circuitry that executes instructions of software which thereby performs various functions described hereinafter, regulates a current applied to the electromagnet 132 such that the horizontal vibration of the engine 2 is dampened by the horizontal vibration of the inertial mass 120. The horizontal vibration of the engine 2 has X and Y axial direction components, a vibration phase, and a vibration amplitude varied depending on the RPM of the engine 2, and may be previously stored in the controller 150. The X and Y axial direction components of the horizontal vibration of the engine 2 refer to ratios in which X axial direction vibration and Y axial direction vibration are occupied in the horizontal vibration The controller 150 may regulate a current applied to each of the electromagnets 134 and 136 based on the RPM of the engine 2 such that the angle between the attractive and repulsive forces, which act between the electromagnets 134 and 136 and the inertial mass 120, and the horizontal direction is varied depending on the aspect of the horizontal vibration of the engine 2. In other words, the controller 150 may individually regulate the current applied to the first electromagnet 134 and the current applied to the second electromagnet 136 based on the aspect of the horizontal vibration of the engine 2. The attractive force acting between the electromagnets 134 and 136 and the inertial mass 120 refers to the total attractive force which is obtained by adding up the attractive force between the first electromagnet 134 and the inertial mass 120 and the attractive force between the second electromagnet 136 and the inertial mass 120. The repulsive force acting between the electromagnets 134 and 136 and the inertial mass 120 refers to the total repulsive force which is obtained by adding up the repulsive force between the first electromagnet 134 and the inertial mass 120 and the repulsive force between the second electromagnet 136 and the inertial mass 120.

Accordingly, the controller 150 may regulate the current applied to the first electromagnet 134 such that the inertial mass 120 and the engine 2 are identical to each other in X axial direction vibration frequency and vibration amplitude, and X axial direction vibration phases of the inertial mass 120 and the engine 2 make a phase difference of 180° from each other. Therefore, the X axial direction vibrations of the engine 2 and the inertial mass 120 cancel each other out such that the X axial direction vibration of the engine 2 may be damped.

For instance, the controller 150 may regulate the current applied to the second electromagnet 136 such that the inertial mass 120 and the engine 2 are identical to each other in Y axial direction vibration frequency and vibration amplitude, and Y axial direction vibration phases of the inertial mass 120 and the engine 2 make a phase difference of 180° from each other. Therefore, the Y axial direction vibrations of the engine 2 and the inertial mass 120 cancel each other out such that the Y axial direction vibration of the engine 2 may be damped.

Therefore, the vibration damping device 100 may damp the horizontal vibration of the engine 2 by dynamically absorbing the horizontal vibration of the engine 2 through the inertial mass 120 having mass smaller than that of the engine 2. Accordingly, the vibration damping device 100 may more effectively damp the vibration of the engine 2, as compared to the ACM system according to the related art which does not damps the horizontal vibration of the engine 2.

Although the above description has been made in that the vibration damping device 1 damps the vertical vibration of the engine 2, and the vibration damping device 100 damps the horizontal vibration of the engine 2, the present disclosure is not limited thereto. For instance, the electromagnets 32, 134, and 136 are mounted between the top surface of the base 10 and the bottom surface of the inertial mass 20, in the first section 113 of the protrusion part 111, and in the second section 115 of the protrusion part 111, respectively, thereby damping the vertical and horizontal vibration of the engine 2.

As described above, according to the present disclosure, the vibration damping device for the vehicle has the following effects.

First, according to the present disclosure, the engine vibration is dynamically absorbed using an inertial mass having mass smaller than that of the engine, thereby saving energy required to damp the vibration of the engine.

Second, according to the present disclosure, the multi-axis vibration of the engine may be damped, thereby efficiently damping the vibration of the engine.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vibration damping device for a vehicle, comprising:
a base connected to an engine;
an inertial mass, having at least a portion that includes a permanent magnet, movably mounted over the base;
an actuator including an electromagnet fixedly mounted on the base to vibrate the inertial mass in a horizontal direction of the engine based on attractive and repulsive forces which alternately act between the inertial mass and the electromagnet in the horizontal direction of the engine; and
a controller configured to regulate a current, which is applied to the electromagnet, such that vibration of the engine generated in the horizontal direction is dampened by vibration of the inertial mass generated in the horizontal direction,
wherein the base includes a protrusion part protruding toward the inertial mass in an X axial direction of the horizontal direction and a Y axial direction of the horizontal direction so that the base forms a cross shape in a horizontal cross-section,
wherein the inertial mass includes a recess part surrounding the protrusion part and configured to hinder the inertial mass to rotate around the base,
wherein the electromagnet includes a first electromagnet coupled to the protrusion part and configured such that the attractive and repulsive forces alternately act in the X axial direction, and further includes a second electromagnet coupled to the protrusion part and configured such that the attractive and repulsive forces alternately act in the Y axial direction, and
wherein the controller individually controls a current applied to the first electromagnet and a current applied to the second electromagnet, such that an angle of the attractive and repulsive forces with respect to the X axial direction and an angle of the attractive and repulsive forces with respect to the Y axial direction are varied with a vibration aspect of the engine.

2. The vibration damping device of claim 1, wherein the controller regulates the current applied to the electromagnet such that a vibration phase of the inertial mass makes a phase difference of 180° from a vibration phase of the engine.

3. The vibration damping device of claim 2, wherein the controller regulates the current applied to the electromagnet such that a vibration amplitude of the inertial mass is identical to a vibration amplitude of the engine.

4. The vibration damping device of claim 1, further comprising:
   an elastic member interposed between the protrusion part and the recess part to elastically support the inertial mass in the horizontal direction.

5. The vibration damping device of claim 4, wherein the elastic member includes a leaf spring provided to surround at least a portion of the protrusion part.

\* \* \* \* \*